(12) United States Patent
Sobel et al.

(10) Patent No.: US 8,539,253 B2
(45) Date of Patent: Sep. 17, 2013

(54) SYSTEM AND METHOD FOR SECURING INFORMATION BY OBSCURING CONTENTS OF A PERSISTENT IMAGE

(75) Inventors: Jason Sobel, Santa Clara, CA (US);
James Voll, Palo Alto, CA (US)

(73) Assignee: NetApp, Inc., Sunnyvale, CA (US)

( * ) Notice: Subject to any disclaimer, the term of this patent is extended or adjusted under 35 U.S.C. 154(b) by 1719 days.

(21) Appl. No.: 11/488,619

(22) Filed: Jul. 18, 2006

(65) Prior Publication Data

US 2008/0022133 A1    Jan. 24, 2008

(51) Int. Cl.
*G06F 21/10* (2013.01)

(52) U.S. Cl.
USPC .......................................... 713/193; 711/162

(58) Field of Classification Search
USPC . 713/193, 165, 166, 167, 176; 707/783–788; 382/181, 190; 711/118, 161, 162
See application file for complete search history.

(56) References Cited

U.S. PATENT DOCUMENTS

| | | | |
|---|---|---|---|
| 5,497,486 A * | 3/1996 | Stolfo et al. ........................... | 1/1 |
| 5,568,629 A | 10/1996 | Gentry et al. | |
| 5,889,934 A | 3/1999 | Peterson | |
| 6,003,044 A * | 12/1999 | Pongracz et al. ..................... | 1/1 |
| 6,598,060 B2 * | 7/2003 | Goldick ........................ | 707/802 |
| 7,127,577 B2 | 10/2006 | Koning et al. | |
| 7,237,021 B2 | 6/2007 | Penny et al. | |
| 7,680,836 B2 * | 3/2010 | Anderson et al. ...... | 707/999.202 |
| 7,698,501 B1 * | 4/2010 | Corbett et al. ................ | 711/114 |
| 2002/0174329 A1 * | 11/2002 | Bowler et al. ..................... | 713/1 |
| 2003/0005300 A1 * | 1/2003 | Noble et al. .................. | 713/172 |
| 2003/0061247 A1 * | 3/2003 | Renaud .......................... | 707/205 |
| 2003/0110266 A1 * | 6/2003 | Rollins et al. .................. | 709/227 |
| 2004/0117572 A1 * | 6/2004 | Welsh et al. .................. | 711/162 |
| 2006/0123211 A1 * | 6/2006 | Derk et al. .................... | 711/162 |
| 2006/0149798 A1 * | 7/2006 | Yamagami .................... | 707/204 |
| 2006/0235801 A1 * | 10/2006 | Strom et al. .................... | 705/59 |
| 2007/0011137 A1 * | 1/2007 | Kodama .......................... | 707/1 |
| 2007/0150651 A1 * | 6/2007 | Nemiroff et al. ............. | 711/114 |
| 2007/0198609 A1 * | 8/2007 | Black et al. .................. | 707/204 |
| 2007/0299888 A1 * | 12/2007 | Thornton et al. ............. | 707/203 |
| 2008/0022133 A1 * | 1/2008 | Sobel et al. .................... | 713/193 |

* cited by examiner

*Primary Examiner* — Kambiz Zand
*Assistant Examiner* — Abu Sholeman
(74) *Attorney, Agent, or Firm* — Blakely, Sokoloff, Taylor & Zafam LLP

(57) ABSTRACT

Files or directories in a persistent image such as a file system backup structure are hidden from general access by establishing a data set used by the file system when accessing the persistent image. The data set indicates a visibility status of the files or directories in the persistent image. Requests to the file system for access to the image are filtered through the data set to prevent unintentionally revealed information in the image from being generally available. Commands to add and remove entries in the data set are provided. The data set may be composed of combinations of lists, in which list entries indicate a hidden file or directory, or indicate a visible file or directory. The data set is maintained in system memory and updated on disk to permit restoration of the data set when a volume is mounted or during recovery from a system crash. Information that was unintentionally revealed in the active file system while a backup was being made can be obscured retroactively to provide protection from general access to improve information security in the file system.

28 Claims, 9 Drawing Sheets

SYSTEM AND METHOD FOR SECURING INFORMATION BY OBSCURING CONTENTS OF A PERSISTENT IMAGE

BACKGROUND OF THE INVENTION

1. Field of the Invention

The present invention relates generally to maintenance of file systems with persistent images for backup structures such as snapshots, and relates more particularly to a system and method for securing information in a persistent image by obscuring the information.

2. Description of Related Art

In enterprise computing environments and other contexts, computer workstations, database servers, web servers and other application servers (collectively hereinafter referred to as "clients") frequently access data stored remotely from the clients, typically in one or more central locations. Computer networks typically connect the clients to mass storage devices (such as disks) that store the data. Such centralized storage (sometimes referred to as "network storage") facilitates sharing the data among many geographically distributed clients. Centralized storage also enables information systems (IS) departments to use highly reliable (sometimes redundant) computer equipment to store the data.

Specialized computers located at the central locations make the data stored on the mass storage devices available to the clients. The specialized computers are commonly referred to as file servers, storage servers, storage appliances, etc., such as storage systems available from Network Appliance, Inc., of Sunnyvale, Calif., and collectively hereinafter referred to as "filers." Software in the filers and other software in the clients communicate according to well-known protocols to make the data stored on the central storage devices appear to users and to application programs as though the data were stored locally on the clients.

The filers present logical "volumes" to the clients. From the perspective of a client, a volume appears to be a single disk drive. However, the volume can represent the storage space in a single storage device, a redundant array of independent disks (commonly referred to as a "RAID set"), an aggregation of some or all of the storage space in a set of storage devices or some other set of storage space. Each volume is logically divided into a number of individually addressable blocks, the same way a disk is divided into blocks (sectors), although the volume blocks can be larger or smaller than disk blocks. The clients issue input/output (I/O) commands to blocks of the volumes, and the filers receive and process the I/O commands. In response to the I/O commands from the clients, the filers issue I/O commands to the appropriate mass storage device(s) to read or write data on behalf of the clients.

In addition, the filers can perform services that are not visible to the clients. For example, a filer can "mirror" the contents of a volume on one or more other volumes. If one "side" of the mirror fails, the filer can continue I/O operations on a remaining mirror side(s), without affecting the clients.

Some filers allow users to take "snapshots" of volumes. These snapshots enable users and system administrators to access data on the volumes, as that data existed at various times in the past, i.e., when the snapshots were taken. For example, snapshots enable users and system administrators to restore files or directories (hereinafter inclusively referred to simply as file system "components") that have been inadvertently deleted or altered. One practical method of taking snapshots of a volume involves storing information about only blocks of the volume that have changed since the previous snapshot, as described in U.S. Pat. No. 5,819,292 to Hitz, et al.

Each time the filer creates a snapshot, the filer stores information about the state of the volume in a different location on the volume. Thus, each snapshot is separately accessible and represents the state of the volume at the time of the snapshot. Each snapshot is time stamped, or some other mechanism, such as a monotonically increasing "generation number," is used to keep track of the order in which the snapshots were taken. To conserve storage space, the filer keeps only a limited number of snapshots on the volume. After writing a predetermined number of snapshots, the filer typically reclaims and reuses storage space occupied by older snapshots.

The filer can access the most recent snapshot to bring the volume on line to allow the volume to be accessed by clients after a restart operation. Bringing a volume online is commonly referred to as "mounting" the volume. In some systems, a log of filing transactions is maintained in non-volatile or battery-backed storage, so that transactions can be "replayed" from the log to bring the restored snapshot up to date with the most current information.

Issues involved in operating the centralized storage system include security of information and conditions under which access to information is permitted. For example, important system files or directories used in the operation of file systems or other network storage devices are typically inaccessible to a regular user to prevent accidental or unauthorized manipulation of system information. Other information of a sensitive nature in a centralized network storage system may be restricted to a certain group of users that has been granted permission to access or manipulate the information. Simple examples of sensitive information may include payroll, sales figures, contact lists, confidential information and so forth. Accordingly, filing systems typically provide a mechanism for setting permissions relating to information access, which can typically be allocated on an individual or group basis. File systems also tend to include capabilities for modifying attributes to permit special treatment of components. For example, a component identified as a system file may have the attribute of being hidden from all users except for a system administrator. File system components that include sensitive information can have an attribute set to hide the component from all users except those with selected permissions. For example, directories are sometimes set up with specific access permissions, so that information in the directories receives special treatment, such as being universally available, or available only for specific purposes. In any case, access to information can be configured with permissions on an automatic or manual basis so that large numbers of components can be processed for permissions on a large-scale basis.

A difficulty that arises in the case of file systems that include snapshots is that the permissions set at a given instant may not be reflected in snapshots already taken. For example, if a file is given a hidden attribute at a specific point in time, snapshots taken prior to setting the hidden attribute include versions of the file in which it is not identified as hidden. Similarly, permissions to access, view, modify or list components may be set erroneously, or components may be inadvertently placed in directories that are publicly accessible. Even if errors such as the above are fixed in the active file system, snapshots taken prior to correction of the error include the components with the erroneous settings. If the snapshot components were to be accessed, a user may accidentally, or without authorization, have access to information of a sensitive or confidential nature. A particularly difficult aspect of this problem stems from the read-only nature of the snapshots, which prevents information attributes from being easily changed. Accordingly, the potential for compromised sensitive information is extensive and difficult to correct in the context of a file backup system based on snapshots. It may be possible to add functionality to snapshots to account for sensitive information with specific attributes. However, the added complexity detracts from the simplicity and speed of the pointer driven, consistency point file system layout. The modification to the file system would be impractical in a file system dependent on a snapshot-type recovery configuration.

BRIEF SUMMARY OF THE INVENTION

In accordance with the present invention, there is provided a system and method for preventing access to selected snapshot components by obscuring the components from snapshot access mechanisms. The system and method identify snapshot components to be hidden or obscured with a data set that acts like a filter description. The data set may take the form of a list, with entries that describe whether snapshot components are hidden.

According to one embodiment, the data set is an exclusion list with identifier entries that correspond to snapshot components that are obscured or hidden. The system directs user commands and application programs that seek access to the snapshot components to the exclusion list to determine if the related component is access restricted in any way. If a component identifier corresponding to the requested component is in the exclusion list, the access request returns without listing the component, or with a return code indicating the component does not exist.

According to another embodiment, the data set is an inclusion list with identifier entries that correspond to snapshot components that are visible or available for access. Snapshot component identifiers that are not on the inclusion list indicate snapshot components that are obscured or hidden. The system directs user commands and application programs that seek access to the snapshot components to the inclusion list to determine if the related component is available for access. If a component identifier corresponding to the requested component is not in the inclusion list, the access request returns without listing the component, or with a return code indicating the component does not exist.

According to another embodiment, the data set has features of the exclusion list and the inclusion list, with identifier entries that correspond to snapshot component visibility status. The system directs user commands and application programs that seek access to the snapshot components to the exclusion list and/or to the inclusion list to determine if the related component is obscured or available for access. If a component identifier corresponding to the requested component is in the exclusion list, or not in the inclusion list, the access request returns without listing the component, or with a return code indicating the component does not exist.

According to an embodiment of the present invention, there is provided a command for placing snapshot component identifiers into the data set. A feature provided by the command permits the command to place multiple snapshot component identifiers in the data set, such as may desirable when a component is present in multiple snapshots. Iterative executions of the command may be run to process a snapshot component for each existing snapshot. The command may include pertinent information such as a component ID, a snapshot ID and various information related to verifying the data set entry, for example.

According to another embodiment of the present invention, there is provided a command to remove component identifiers from the data set. A feature provided by the command permits the command to remove multiple snapshot component identifiers from the data set, such as may desirable when a component is present in multiple snapshots. Iterative executions of the command may be run to process a snapshot component for each existing snapshot. The command may include pertinent information such as a component ID, a snapshot ID and various information related to verifying the data set entry, for example. Instances where such a command would be useful include restoration to the active file system of a snapshot component that is hidden, deletion of a snapshot with components identified as hidden, and so forth. Once a component is identified as visible, or no longer obscured, the component can be accessed through usual system commands.

According to a feature of the present invention, the data set is modified upon deletion of a snapshot with components identified in relation to the data set. For example, a snapshot component identifier is removed from the exclusion list or the inclusion list when a snapshot that includes the identified component is deleted. Snapshot deletion may occur through ordinary system maintenance, such as when the set number of snapshots to maintain is exceeded. The exclusion list entry or the inclusion list entry may be removed through execution of an appropriate command discussed above. A facility may also be provided to modify the data set upon deletion of a snapshot simply by appropriately modifying the data set for any entry associated with the deleted snapshot.

According to an aspect of the present invention, a metafile is used as the storage location for the data set. The data set is readily available within the active file system and is saved with each snapshot taken. Crash recoveries restore the metafile and the data set to maintain the continuity of obscured snapshot components.

According to a feature of the present invention, the process of mounting a volume includes a check to determine if a metafile on the volume provides for obscuring snapshot components. If a hidden snapshot component is indicated in the metadata, the data set for the snapshots included on the volume is populated with the appropriate component identifiers. Once the data set is populated, the volume mounting process may complete and components on the volume may be generally accessed, with the exclusion of the snapshot components as indicated by the data set.

In accordance with another aspect of the present invention, hidden snapshot components may be listed by analyzing the data set. For example, a list of hidden components may be provided by reading each of the identifier entries in an exclusion list and converting the entry IDs to path names. Alternately, or in addition, a list of hidden components may be provided by listing all snapshot files except those on an inclusion list.

According to another aspect of the present invention, the command to add a component identifier to the data set allocates memory to hold information about the component. The memory may be deallocated in certain instances, such as, for example, when the volume is unmounted, if the snapshot that includes the component is deleted or if a command to remove the component identifier from the data set is run.

BRIEF DESCRIPTION OF THE SEVERAL
VIEWS OF THE DRAWINGS

The invention is described in greater detail below, with reference to the accompanying drawings in which.

DETAILED DESCRIPTION OF THE INVENTION

Figure 1:
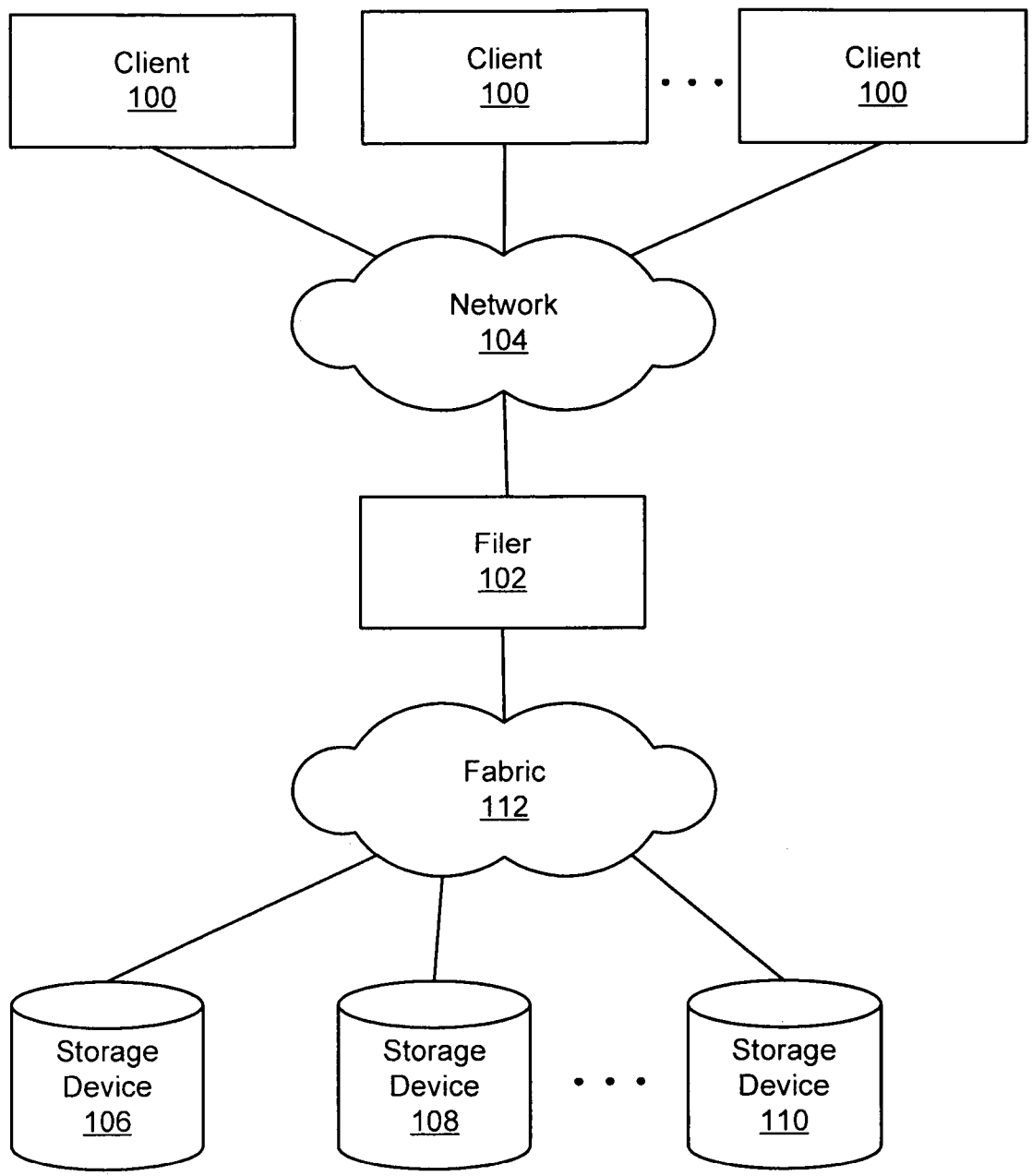
FIG. 1 is a block diagram of a prior art network file storage system.

As noted, workstations and other clients are frequently connected to filers via local or wide area networks (LANs or WANs). FIG. 1 is a block diagram of an exemplary network storage system, in which the presently disclosed system and method can be used. Such a network storage system is available from Network Appliance, Inc., Sunnyvale, Calif. Clients 100 are connected to a filer 102 via a network 104, such as a packet-switched network. The filer 102 is a storage system connected to mass storage devices 106, 108 and 110 via a fabric 112, such as a fiber distributed data interface (FDDI) network, for example. Other numbers of filers and storage devices and other network technologies can be used. For example, the filer 102 supports fiber channel topologies such as FC-AL (Fiber Channel-Arbitrated Loop) among others. The snapshot system is implemented in the filer 102, such as by a processor executing instructions stored in a memory (not shown) in the filer.

In the present description, the term "filer" indicates both the hardware and the software used to implement a file storage system. For example, a file storage operating system operating on filer hardware typically implements commands and responds to events to carry out the functions of the file storage system. Accordingly, the term "filer" is meant to encompass the concepts related to the file storage system hardware and software, and refers to these concepts associated with the file storage system interchangeably.

The filer 102, implemented with an exemplary storage operating system, such as Data ONTAP®, commercially available from Network Appliance, Inc., of Sunnyvale, Calif., makes some or all of the storage space on the storage devices 106-110 available to the clients 100 in a well-known manner. Each of the storage devices 106-110 can be an individual disk, several disks, a RAID set or some other mass storage device(s). The filer 102 presents each storage device 106-110 or group of storage devices as a volume to the clients 100. Each volume consists of a set of consecutively logically addressed blocks. In some cases, each block is the same size as the smallest addressable unit on the storage devices 106-110, such as a disk sector. In other cases, each block represents more or less than a whole number of (at least logically) contiguous addressable units on the storage devices 106-110. For example, in filers available from Network Appliance, Inc. of Sunnyvale, Calif., each block contains 4,096 bytes (4 KB).

Volumes store components, such as data files, scripts, word processing documents, executable programs and the like. In the context of this disclosure, the term "metadata" means information about which blocks of a volume are allocated to files, which blocks are unallocated (i.e., free), where each block or segment (i.e., contiguous group of blocks) of each file is stored on a volume, directory information about each file, such as its name, owner, access rights by various categories of users, etc. and information about the volume, such as the volume's name and size and access rights by various categories of users. A volume's metadata is typically stored on the volume in specially designated files and/or in specially designated locations, as is well known in the art. A filer maintains the metadata for each volume and updates the metadata as the filer creates, extends, deletes, etc. components on the volume. All the components on a volume (including the files that store metadata) and any metadata stored on the volume other than in files are collectively referred to as a "file system."

Figure 2:
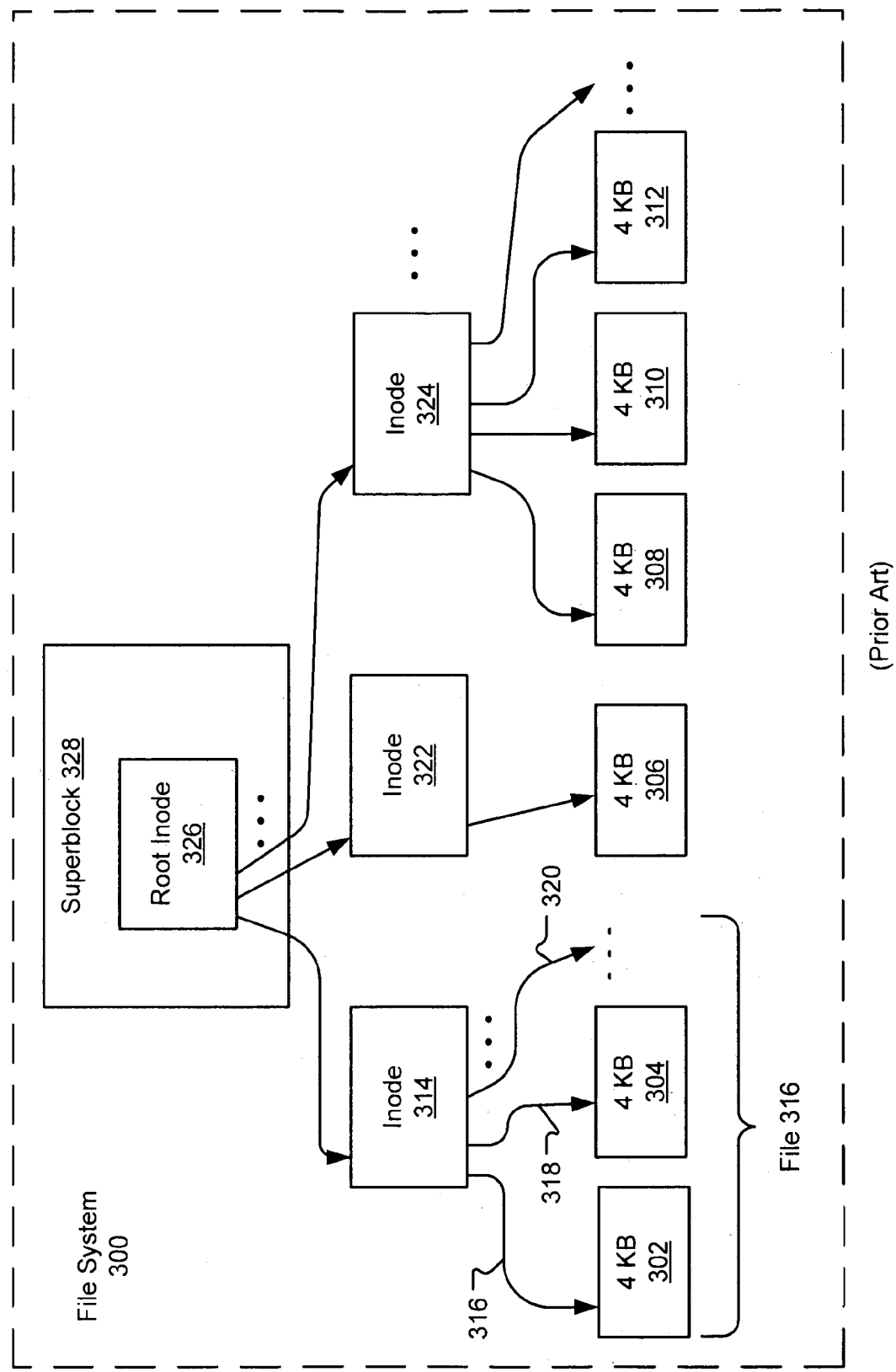
FIG. 2 is a block diagram of a prior art file system.

FIG. 2 is a block diagram of an exemplary file system 300. Blocks 302-312 of 4,096 bytes (4 KB) each are allocated to store files or portions of files. A data structure, commonly referred to as an "inode," is allocated for each file to store metadata that describes the file. For example, inode 314 contains data that describes a file 316 that occupies blocks 302, 304, etc. The inode 314 contains a pointer 316, 318, 320, etc. to each block 302, 304, etc. of the file 316. These pointers 316-320, etc. facilitate accessing the blocks 302, 304, etc. of the file 316, as is well known in the art. Other inodes 322 and 324 similarly describe other files.

A "root inode" 326 contains pointers to the individual inodes 314, 322, 324, etc. The root inode 326 and volume information, such as the volume's name and size and information about snapshots stored on the volume, are stored in a data structure commonly known as a superblock 328.

An inode (such as inode 314, 322, or 324) typically contains room for a fixed number of pointers (such as pointers 316, 318, 320, etc.) If a file occupies more blocks than the inode can point to, each inode pointer points to an "indirect block" (not shown), instead of a block of the file, and each indirect block contains pointers to the blocks of the file. For a yet larger file, two or more levels of indirect blocks are used. For a very small file, rather than allocating blocks (such as blocks 302, 304, etc.) to store the file's contents, the file's contents are stored in the inode, where the inode would otherwise store pointers (such as pointers 316, 318, 320, etc.) Other well-known file system and metadata schemes can also be used.

As noted, a filer can locate any file or portion thereof (such as to read or write the file or portion) by following pointers from the root inode 326, through the appropriate inode 314, 322, or 324, etc., possibly through one or more levels of indirect block(s) (not shown), to the appropriate content block(s) 302-312, etc. In any case, the filer always begins at the root inode 326. Thus, the filer frequently accesses the root inode 326 and other metadata related to frequently accessed files.

For performance reasons, many filers cache some or all of this metadata. When a filer mounts a volume, the filer reads the volume's superblocks 328, including the root inode 326, and the filer stores a copy of the root inode 326 in its cache. Also when the filer mounts the volume, or later as clients access components on the volume, the filer caches other metadata, such as the inodes 314, 322, 324, etc., indirect blocks (not shown) and, optionally, the most frequently accessed ones of the content blocks 302-312, etc.

As clients create, delete, extend, etc. the components on the volume, the filer modifies the cached metadata to reflect changes in the amount of free and allocated space on the volume, which blocks are allocated to the files on the volume, etc. Periodically and/or occasionally, the filer writes modified cached metadata to the volume, i.e. the filer "flushes" the cache to the underlying mass storage device(s). The cache is also flushed when the filer dismounts the volume.

Figure 3:
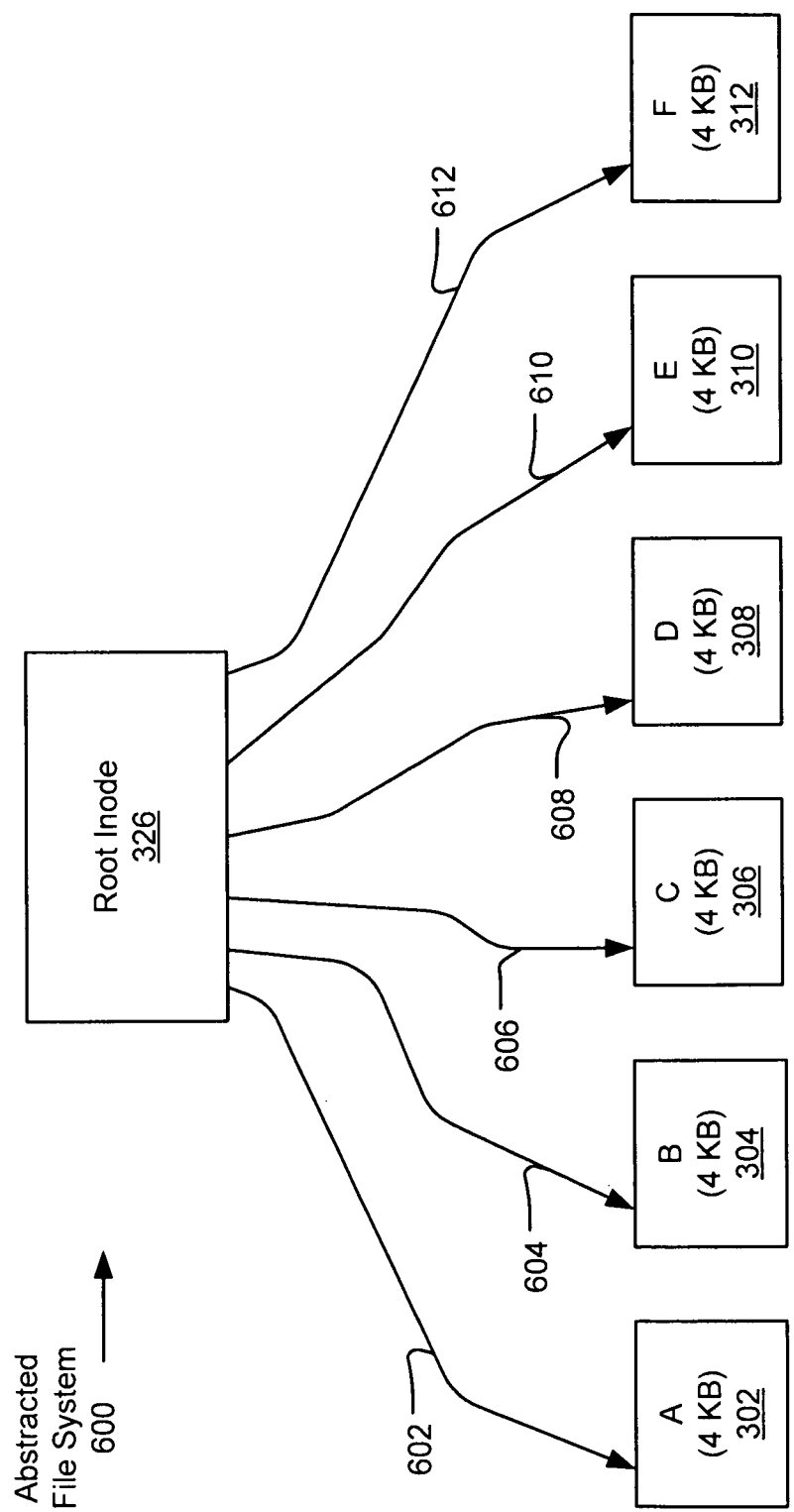
FIG. 3 is an abstract block diagram of the prior art file system of FIG. 2.
Figure 6:
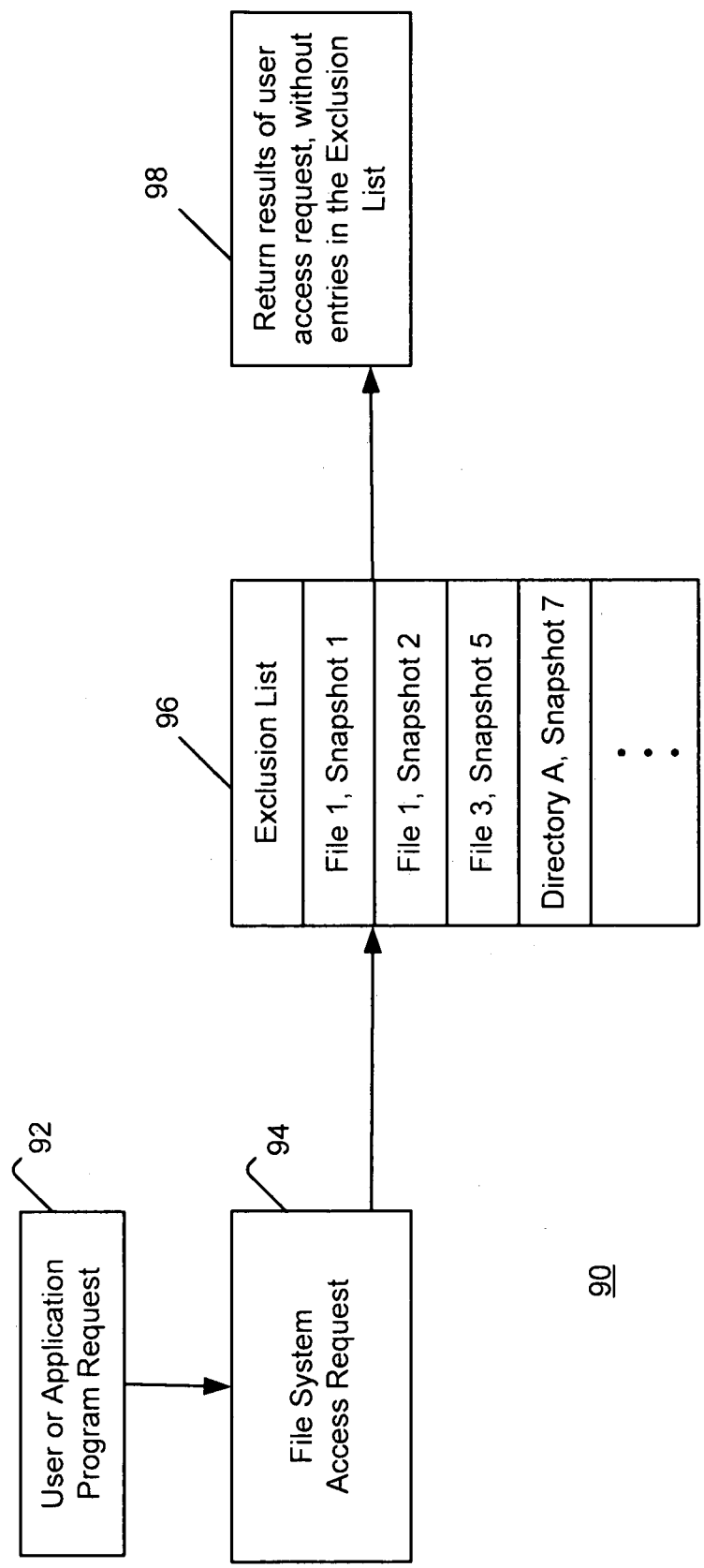
FIG. 6 is a diagram illustrating exclusion list access according to the present invention.

The file system 300 of FIG. 2 is shown in abstracted form 600 in FIG. 3. In FIG. 6, the root inode 326 is shown pointing (via pointers 602, 604, 606, 608, 610 and 612) to file blocks 302-312. For simplicity, the inodes 314, 322 and 324 and other details shown in FIG. 2 are omitted from FIG. 3.

Figure 4:
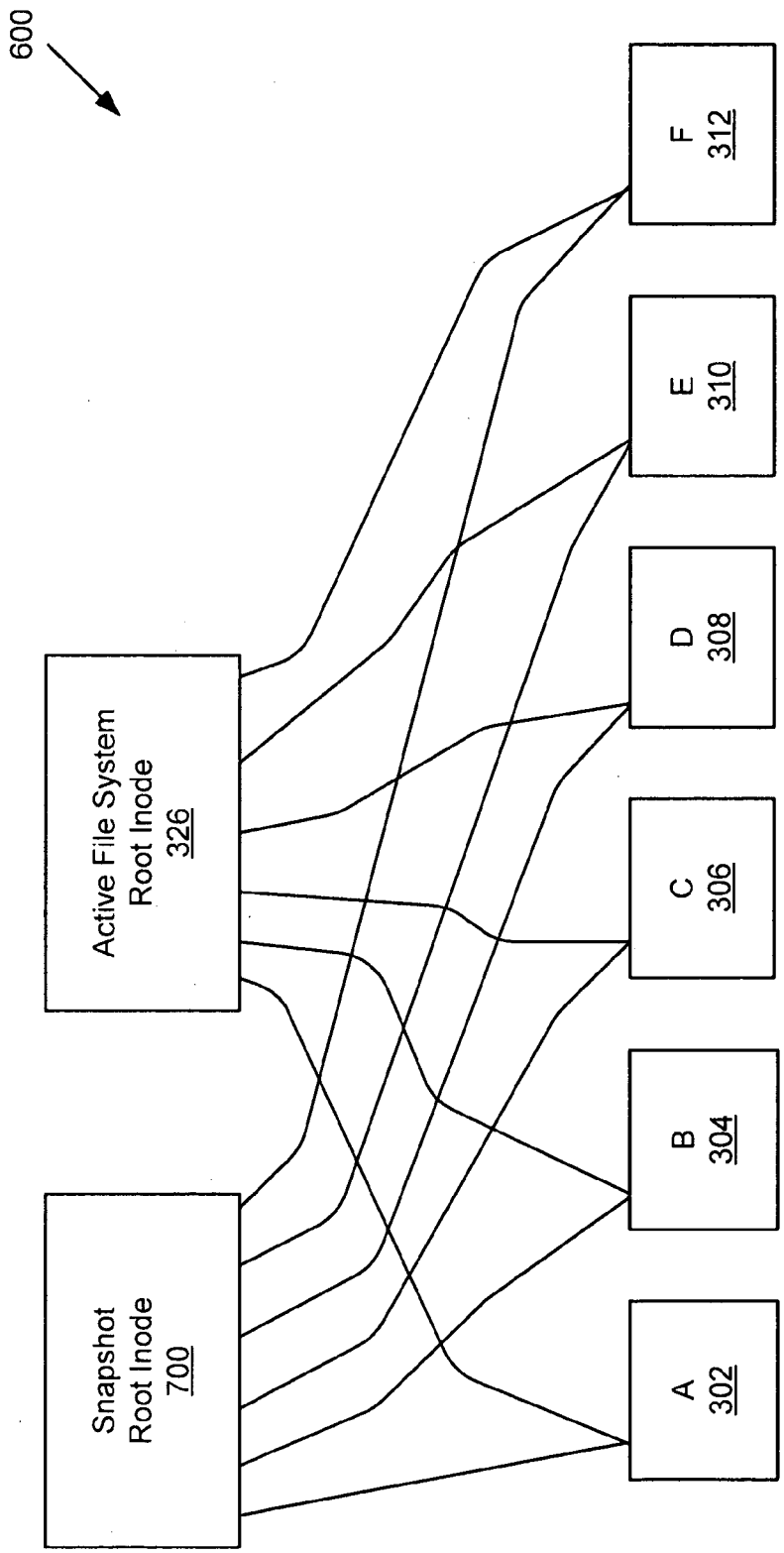
FIG. 4 is a block diagram of the prior art file system snapshot.

When a filer takes a snapshot, which is a persistent image of a volume, the filer makes a copy of the root inode 326, as shown in FIG. 4. The copy of the root inode is referred to as a "snapshot root inode" 700. Thus, immediately after the snapshot is taken, the snapshot root inode 700 points to the same file blocks 302-312 as the active file system root inode 326. The filer allocates space on the volume and stores the snapshot root inode 700 in the allocated space. Consequently, both the snapshot root inode 700 and the active file system root inode 326 can be used to access the components of the volume.

Figure 5:
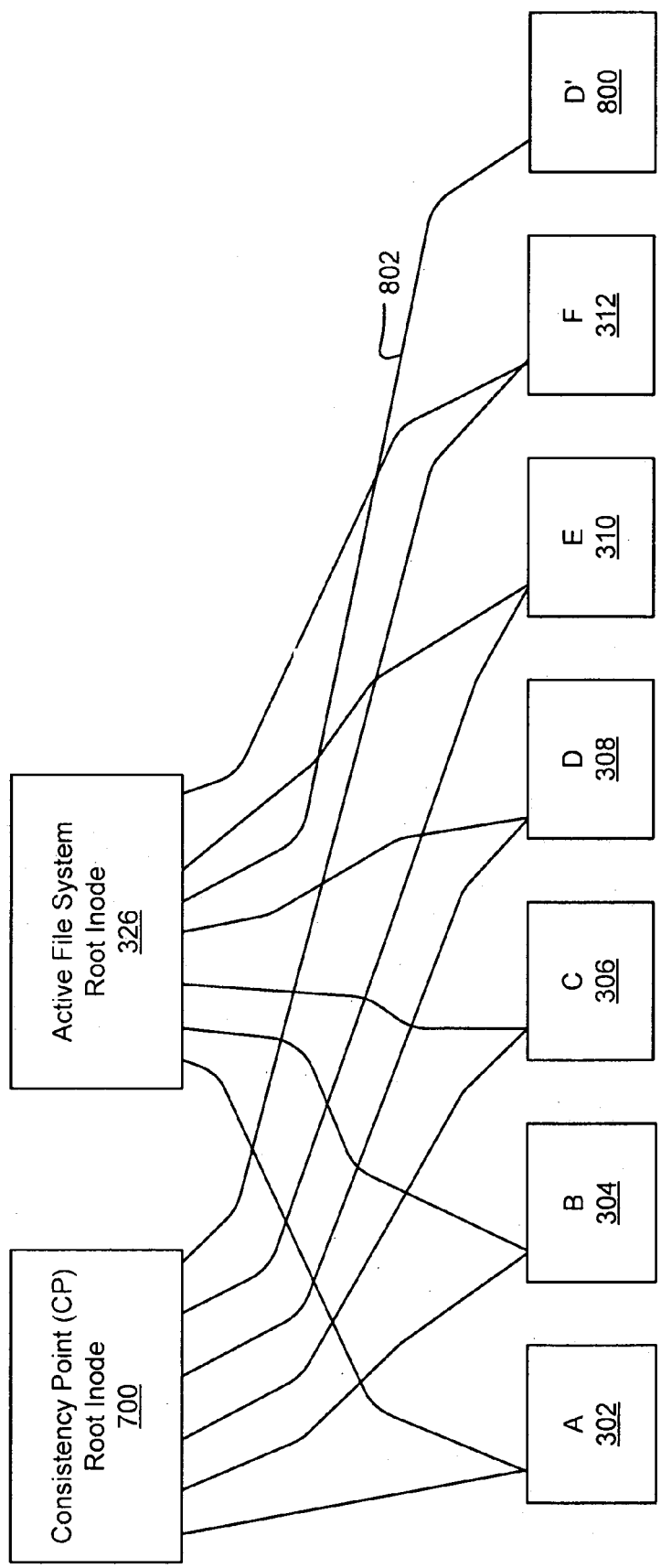
FIG. 5 is a block diagram of the file system of FIG. 4 after a block has been modified.

Over time, clients and/or the filer's operating system modify the components on the volume. As shown in FIG. 5, when a block, such as block D 308, is modified, the filer allocates a new block, such as block D' (D prime) 800, to store the modified contents. Pointers 802 in the metadata are adjusted, so the modified block D' 800 can be found by following pointers starting at the active file system root inode 326. Thus, using the active file system root inode 326, the current (modified) file contents can be found and accessed.

The snapshot root inode 700 is not, however, modified. Thus, using the snapshot root inode 700, the previous (un-modified) contents of the file can be found and accessed. Consequently, using the file system represented by the snapshot root inode 700 provides access to components, as these components existed at the time of the snapshot.

Since snapshots include the state of components at the time the snapshot was taken, errors or inadvertent settings can be included in snapshots. This situation may give rise to some undesirable outcomes. First, the snapshot may be restored, thereby restoring the errors or inadvertent settings. Second, the errors or inadvertent settings may permit unwanted or unauthorized access to sensitive information in the snapshots. Security of data or information contained in snapshots is thus an important issue that holds the potential for high-risk information exposure. For example, a file may include confidential data and may have permissions set erroneously that permit access by general users. While the error can be corrected in the active file system, the error persists in the snapshots taken while the error existed. The file system stores snapshots as read-only data, so that retroactive correction of errors in the snapshot represents a challenge.

The errors may be of a highly sensitive nature, such as permitting access to confidential data or information, creating inadvertent gaps in security procedures or access, or publishing private data, for example. In these situations, a simple corrective measure is to delete the snapshot that includes the error or inadvertent settings. Deleting the snapshot is a less than optimal solution, due to the amount of data lost for backup and recovery purposes based on what can be a relatively small amount of undesirable data. In addition, a number of snapshots are potentially deleted, compromising the intent of the snapshot backup system.

To combat the problem of exposing sensitive data or propagating errors related to file access or permissions, the present invention provides a technique and infrastructure for limiting access to components in a snapshot. While the error related to components in the snapshot may take a number of forms, the solution according to the present invention simply hides selected snapshot information. That is, the error may be an incorrect file or directory attribute, such as one permitting viewing, copying, modification or moving. The error may also be placement of a component in an inappropriate directory. Due to the read-only nature of the snapshot, simply hiding, or obscuring, the desired snapshot information overcomes the errors related to snapshot information access or permission that may occur. By hiding, or obscuring, the snapshot information, the system and method of the present invention provides a measure of security for the snapshot information, referred to herein as security by obscuring information. The system and method of the present invention include a mechanism for hiding the snapshot components indicated, so that general queries for components, such as directory listings or searches, do not return the specified components.

According to an exemplary embodiment, the mechanism for hiding snapshot components includes a data set that identifies snapshot components that indicate the snapshot information to be hidden. According to an aspect of this embodiment, the data set is formed as an exclusion list, in which entries in the data set represent snapshot components that are to be hidden or obscured from snapshot access requests. According to another aspect of this embodiment, the data set has an inclusion list that represents snapshot components for which customary access is granted. According to this aspect, snapshot components for which there are no corresponding inclusion list identifiers are hidden or obscured from snapshot access requests. The data set may be composed of a combination of one or more exclusion lists and one or more inclusion lists to provide flexibility and to meet specific application needs, for example. That is, the data set is not limited in its content to simplified functions for obscuring snapshot information, but may be adapted with the file system to meet the needs of given applications related to snapshot information access.

Referring now to FIG. 6, a diagram 90 illustrates the role of an exclusion list 96 in response to a snapshot access request 92 by a user or an application program. Exclusion list 96 has one or more entries that are component identifiers corresponding to snapshot or persistent image components. The component identifiers in exclusion list 96 represent snapshot or persistent image components, such as files or directories, that are filtered or obscured with respect to system access requests. The component identifiers may be, for example, file handles or directory handles, which provide a means for identifying the files and directories to the system. Exclusion list 96 may be empty, indicating that all files and directories in all snapshots are available, or not obscured.

One or more system commands, which may execute automatically, add or remove entries in exclusion list 96. For example, the deletion of a snapshot may prompt a system command to execute to remove entries in exclusion list 96 that correspond to the removed snapshot. Appropriate security concerns are addressed in permitting the system command to modify exclusion list 96. For example, system commands that administer exclusion list 96 may be provided in a diagnostic mode that is accessible solely by a system operator. Alternately, or in addition, system commands that modify exclusion list 96 may be unavailable to general users, and executable only by individuals with specific permissions for the system commands to modify exclusion list 96. Instructions for using the system commands to modify exclusion list 96 may also be hidden or not included in online or general help information. With such a measure, limited numbers of individuals, to include system administrators, are aware of the commands and their usage.

System access request 92 may take the form of a directory listing command, for example, in which the user or application program requests a listing of all components in a directory, including files and subdirectories. The filer system translates user request 92 into a system request 94, which includes command primitives used to find and list all components of the requested directory. When the directory or access request specifies information in a snapshot, system request 94 checks exclusion list 96 to determine if the requested snapshot information is excluded.

In performing a check on exclusion list 96, system request 94 first determines if exclusion list 96 is non-empty. If exclusion list 96 is empty, system request 94 continues with normal operations, without excluding snapshot components. When exclusion list 96 is populated with entries, such as file or directory identifiers, system request 94 initiates a search of exclusion list 96. Exclusion list 96 may take the form of a specific data structure, such as a tree, a linked list, an array, a set of pointers, a hash table and so forth. The data structure may be selected to permit high performance searching algorithms to be used in searching exclusion list 96. If exclusion list 96 has a large number of entries, the data structure organization and searching algorithm may become important for overall filer system performance. If a match is found between the requested snapshot information and an entry in exclusion list 96, system request 94 returns no information about the requested information, as if the information did not exist. The return by system request 94 may be in the form of a simple null entry, or a return code indicating the file or requested information was not found. When system request 94 returns no information about the requested information due to a matched entry in exclusion list 96, the response emulates the response to a request where the requested information does not exist. Accordingly, the response based on a matched entry in exclusion list 96 provides a measure of security by obscurity, because the response denies the requester any data about the requested information. The response prevents the requester from being made aware of any information that is purposely obscured by having an entry in exclusion list 96, thereby providing a measure of security for the information.

The exclusion list provided by the present invention prevents access to snapshot information through entries in a data structure available to file or directory lookup requests to permit the listed snapshot component to be skipped, or hidden from general observation or access. Entries in exclusion list 96 identify files or directories, and may include identifiers for various other items, such as snapshot or image identifiers. Exclusion list entries may include other security information, such as permissions for access to the snapshot components. The permissions permit or prevent component access based on a user's security settings, for example. Alternately, or in addition, permission functions may be incorporated into snapshot lookup requests to permit or prevent snapshot component access in conjunction with the exclusion list. This extra level of security provides more flexibility in forming a snapshot filter to address snapshot information access concerns.

The exclusion list references components from any particular snapshot and stores snapshot identification information in each entry. The exclusion list may be empty, in which case file system lookup requests do not attempt to search the exclusion list, but carry on with ordinary processing. The list of exclusion items can be sorted according to any particular key to permit fast traversal of the list by component lookup mechanisms.

Once system request 94 completes, a request result 98 provides the user with all the information requested by user access request 92, but without any snapshot information that was indicated in exclusion list 96.

Of the many possible events that may lead to errors where a snapshot component may be accidentally visible, two common occurrences are incorrectly assigning component permissions, and placing a component into an incorrect directory. In each of these cases, sensitive information may be at risk, such as by permitting general viewing or copying of sensitive snapshot components. Incorrect component permissions may lead to undesired or unauthorized access to sensitive information. Directories and directory structures may be set up with particular permissions, so that storing information in other directory locations may defeat the special purpose function of the directories, which can lead to undesired or unauthorized access to sensitive information.

Figure 7:
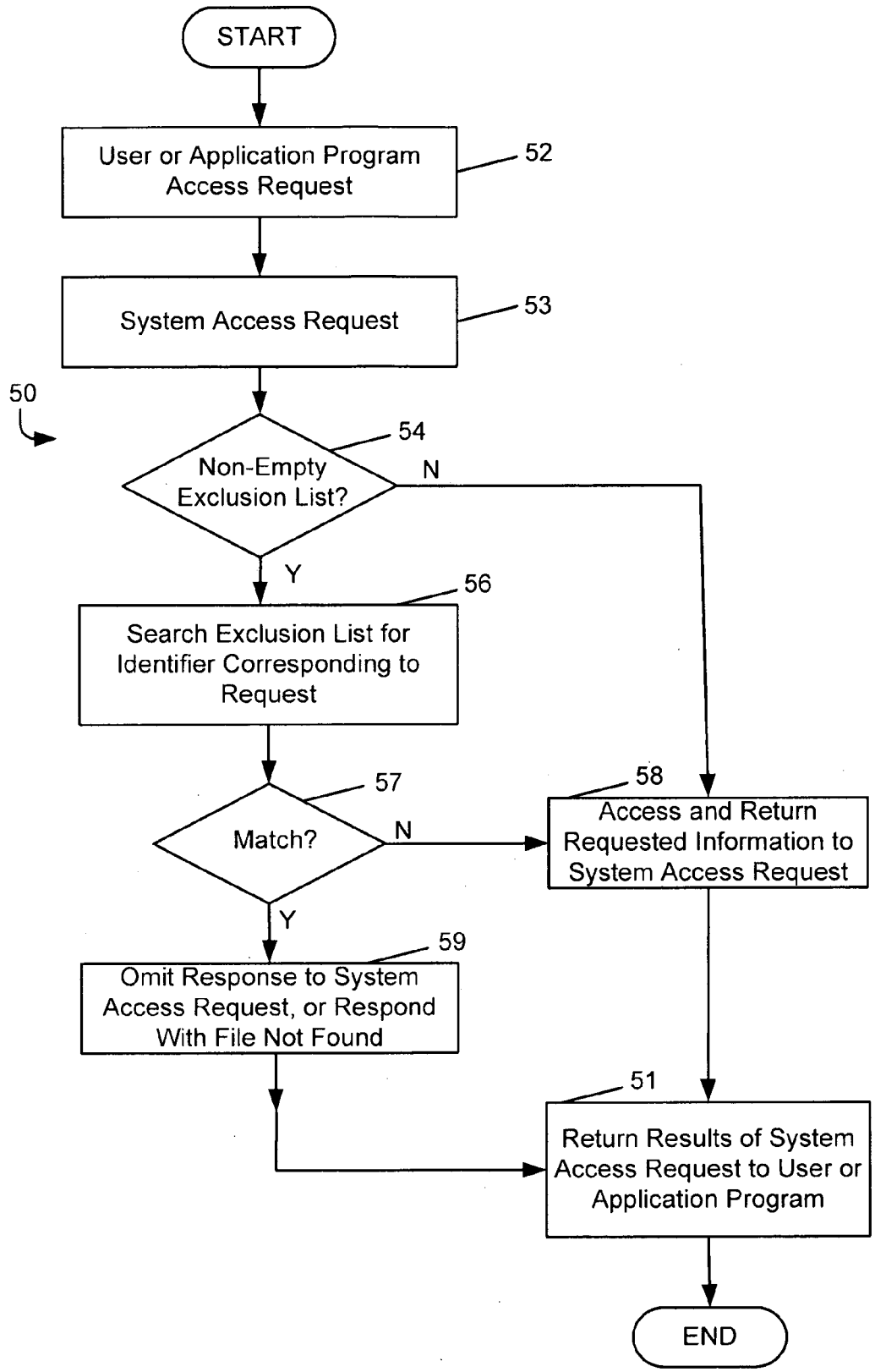
FIG. 7 is a flow chart describing a component access process in accordance with the present invention.

Referring now to FIG. 7, a flowchart 50 illustrates the process for responding to a request for snapshot information in accordance with the present invention. In block 52, a user or application program request for access to snapshot information is received. The request is passed to block 53, where the request is translated into system command primitives to obtain the requested information. The command primitives access logical or physical devices to retrieve the requested information. During the course of execution, the primitives examine the exclusion list in accordance with the present invention, first by determining in decision block 54 whether the exclusion list is empty. If the exclusion list is empty, there is no need to search for excluded snapshot components, and the requested snapshot information is accessed and a response provided in block 58. The response is provided by the command primitives accessing the physical or logical devices to obtain the requested snapshot information, which is returned to the user or application program. If the exclusion list is non-empty, it is searched in block 56 for an identifier corresponding to the requested item. If there is a match in decision block 57, the requested item is skipped in the response in block 59, or a flag is returned to indicate the item was not found. If the requested item was not found on the exclusion list, the item is returned to the system request as an ordinary response in block 58. The response to the system access request is returned to the user or application program in block 51. Multiple command primitives may be issued to respond to a single user access request where, for example, multiple file names or identifiers are requested, such as in the case of a directory listing request.

Figure 8:
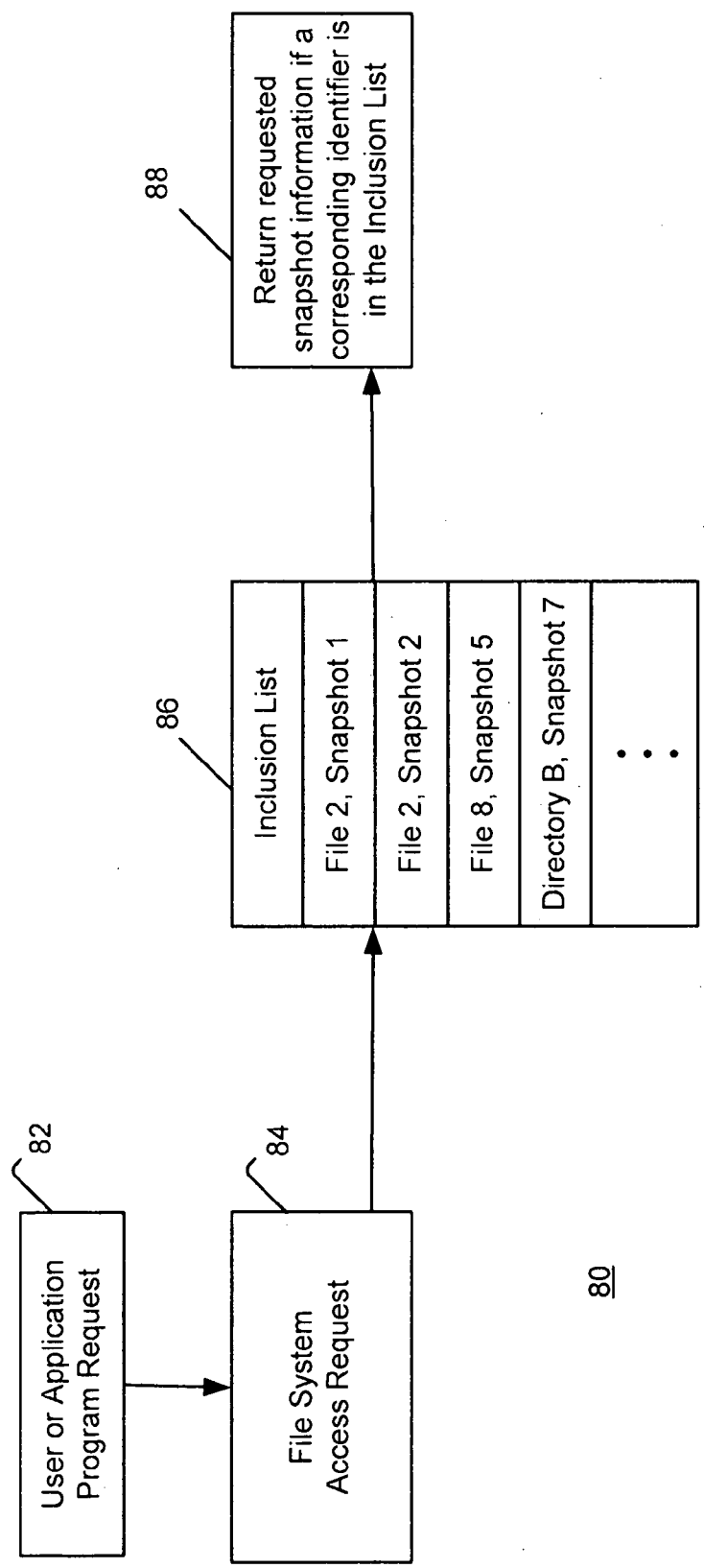
FIG. 8 is a diagram illustrating inclusion list access according to the present invention.

Referring now to FIG. 8, a diagram 80 illustrates the operation of an inclusion list 86 in response to a snapshot access request 82 by a user or application program. Inclusion list 86 has one or more entries that are component identifiers that correspond to snapshot or persistent image components. The component identifiers found in inclusion list 86 represent permissive snapshot components, such as files or directories for which customary access is granted. The component identifiers may be, for example, file or directory handles that identify the associated files or directories to the filer system. Inclusion list 86 may be empty, indicating that all files and directories in all snapshots are obscured or hidden. If a snapshot component does not have a corresponding identifier provided in inclusion list 86, then that snapshot component is obscured to file system access request 84.

Inclusion list 86 is updated in accordance with snapshot or file system activities. For example, file system commands may add or remove entries to/from inclusion list 86. The deletion of a snapshot for which inclusion list 86 has corresponding component identifiers may prompt execution of a command to remove those component identifiers from inclusion list 86. Depending upon the nature of the application and content of a given snapshot, inclusion list 86 may be very large or very small. For example, there may be a small amount of sensitive data included in a snapshot, indicating a large inclusion list 86. A large amount of sensitive information in a snapshot may lead to a small inclusion list 86. Some applications may be more conveniently implemented with respect to the disclosed data set as a combination of exclusion list 96 and inclusion list 86. For example, a given snapshot may be access-restricted or have obscured components on the basis of an inclusion list, while another snapshot may have obscured components on the basis of an exclusion list. In any event, the data set acts as a filter for snapshot access requests to determine a suitable response to the request, by returning snapshot component information or an indication that the information is unavailable.

For each snapshot access request, the data set is examined to determine whether it indicates any hidden entries. If there is no indication of hidden snapshot components in the data set, the snapshot access request continues as normal. In the case of an empty, exclusion list, or an inclusion list that includes all snapshot components, the snapshot access request simply returns the desired information from the snapshot. In the case of an exclusion list that includes all snapshot components, or an empty inclusion list, the snapshot access request returns no information, since all snapshot entries are indicated as obscured.

Inclusion list 86 may be empty, indicating that all snapshot components are hidden or obscured from general access. The inclusion list may become empty through a number of mechanisms, including through execution of file system commands that remove entries from inclusion list 86. For example, as indicated above, the deletion of a snapshot from the file system may prompt execution of a file system command to remove entries from the inclusion list that are associated with the deleted snapshot. As another example, the snapshots to which inclusion list 86 refer may be confidential, so that inclusion list 86 is maintained as an empty data structure to prevent access to the confidential snapshots.

Inclusion list 86 may be populated with one or more entries, such as file or directory identifiers, to indicate permissive access to snapshot components. Inclusion list 86 may become populated through execution of a system command to add entries to inclusion list 86. As an example, entries may be added to inclusion list 86 upon creation of a snapshot which may have a majority of components that are hidden or obscured. The system command to add entries to inclusion list 86 may be executed one or more times to add the desired entries for the relevant snapshot.

When the data set includes entries to indicate that snapshot information should be obscured, the appropriate action is taken, depending upon whether the access request is channeled through an exclusion list or an inclusion list. For example, inclusion list 86 is searched, and if a match is found for the identifier of the requested snapshot component information, the requested information is returned with system request 84. Otherwise, if no identifier match is found in inclusion list 86, no information related to the request is returned. For example, the obscured result may be no information at all, or an indication that the requested information does not exist.

Figure 9:
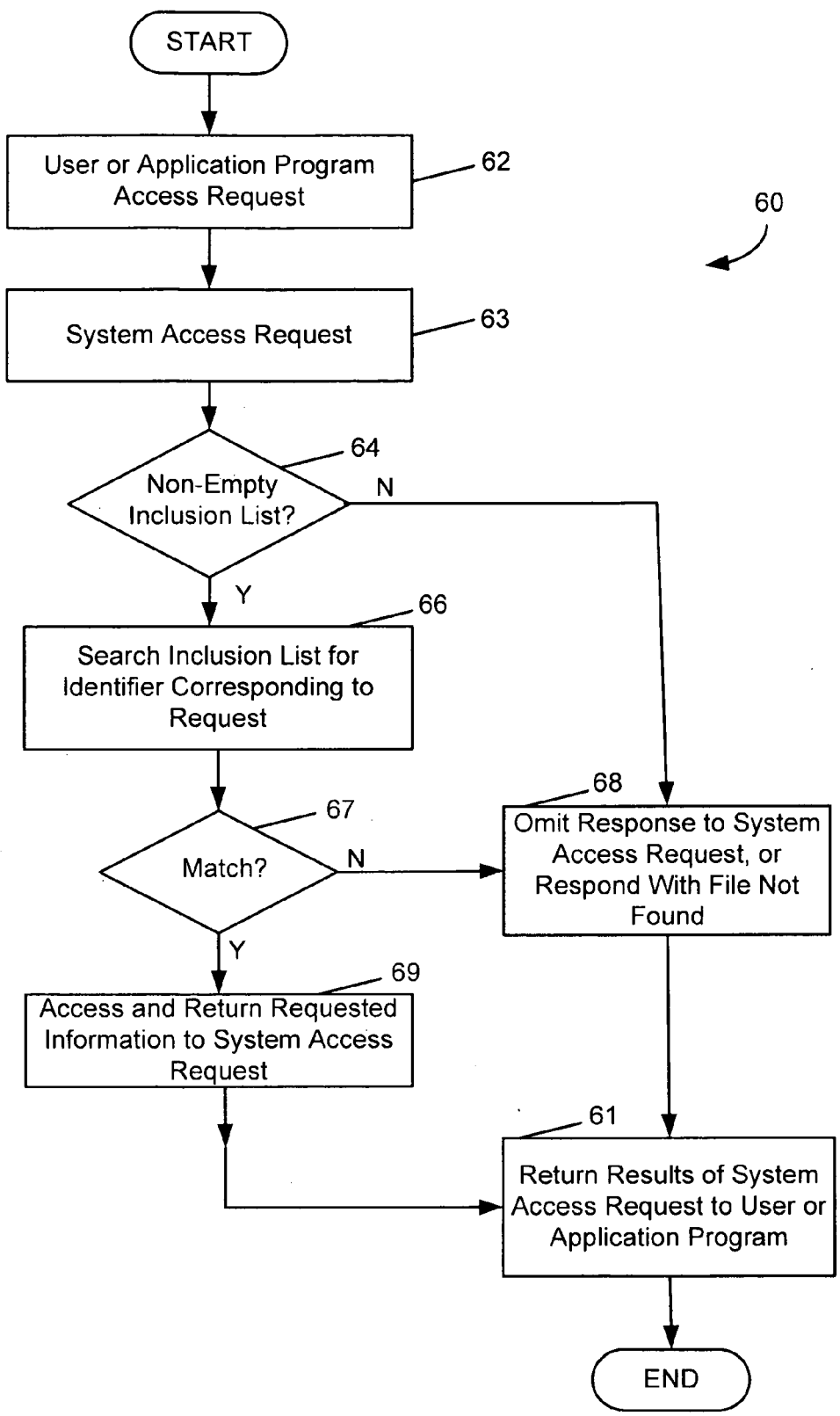
FIG. 9 is a flow chart describing a snapshot component access process in accordance with the present invention.

Referring now to FIG. 9, a flowchart 60 illustrates the process for responding to a request for snapshot information where the data set is implemented as an inclusion list. In block 62, a user application program request for access to snapshot information is received. The request is passed to block 63, where the request is translated into system command primitives that access logical or physical devices to retrieve the requested information, for example. The command primitives access a snapshot by first determining if an inclusion list is empty in block 64. If the inclusion list is empty, then the entire related snapshot information is restricted, or obscured, and a response that omits the requested information is returned to the system in block 68. If the inclusion list is populated, a search is conducted in block 66 to attempt a match between the identifier of the requested information and an entry in the inclusion list. If a match is found, as determined in decision block 67, the requested information is accessed in the snapshot and returned to the access request in block 69. If a match with entries in the inclusion list is not found, a response for the requested information is omitted in block 68. The appropriate response is returned to the user or application program in block 61.

Entries in the data set are modified through a command to the file system. In the case of an exclusion list, for example, a "hide" command may be used to add entries to the exclusion list to obscure those snapshot components from general access requests. Adding a snapshot component identifier to the exclusion list changes the snapshot component, status to that of hidden or obscured. The hide command may include a specific reference to the component, and a specific reference to the snapshot in which the component will be declared hidden. The command may include exemplary fields for specifying the snapshot component, the snapshot in which the specified components are located, as well as other component identification or verification information. For example, the command can accept a path specification to the snapshot component(s). This path specification can include wildcards, in which case all matching components are processed. Optionally, the command accepts a creation and/or modification date, file owner, file size and/or other qualifications as part of all of the specification of the component(s) to be processed.

The command operates by retrieving a file handle or component ID associated with the specified component(s), retrieving a snapshot ID and collecting or generating other information related to identification or verification of the component or snapshot. Execution of the hide command stores the identifying information in a structure in the exclusion list or removes the identifying information from the inclusion list. The structure may take the form of a record, and may include organization or searching information related to organization of the exclusion list. For example, the exclusion list may be organized as a tree, a linked list, an array, a set of pointers, a hash table and so forth. The command to mark components as hidden through inclusion in the exclusion list can be run multiple times, for example, in a script, to include a particular group of files, a number of directories, a number of snapshots, and so forth.

A command is also available to remove a component identifier from the exclusion list, or add a component identifier to the inclusion list, which may be useful in instances where it is desirable to restore a hidden snapshot component to the active file system, for example. The usual file or directory lookup commands are unaware of the hidden snapshot components, thus hidden components in a snapshot can not be identified with typical system commands. Accordingly, if the desired snapshot component is hidden, or identified by the exclusion or inclusion list as obscured, it cannot be restored using typical system mechanisms for retrieving a component from a snapshot. Thus, the "unhide" command to remove the desired component from the exclusion list or to add it to the inclusion list first bypasses the normal file or directory lookup mechanisms to obtain a file handle or component identifier for the hidden snapshot component. In an exemplary embodiment, the unhide command sets a flag for the normal system snapshot lookup mechanisms to bypass the exclusion list or inclusion list. The lookup mechanisms take a file or directory name passed by the unhide command, matches the name(s) and return a file handle(s) or component identifier(s). The unhide command also includes fields for identifying a particular snapshot and other identification or verification information, as discussed above. With the file handle or component identifier, snapshot identification and other identification or verification information, the unhide command searches the exclusion list or inclusion list to find entries matching the specified identifiers. When a match is found on the exclusion list, the command simply deletes the corresponding exclusion list entr(ies) to "unhide" the file(s) or director(ies). If a match is not found in the inclusion list, the command adds the component identifier to the inclusion list.

Certain events can cause automatic execution of the unhide command to remove a component entry from the exclusion list. For example, as snapshots are continually taken, and older snapshots are deleted, hidden snapshot components associated with deleted snapshots can be removed from the exclusion list. Removal of the component entry from the exclusion list can be done through the command discussed above in which the entry is simply removed. The "unhide" command can be executed in these instances automatically or manually. In addition, or alternately, the exclusion list can be searched for references to the snapshot that is being deleted, and the entries associated with the snapshot ID can be automatically removed. This activity can be accomplished independently, based on the deletion of a snapshot, rather than through explicitly initiating an "unhide" command.

In the case of a data set that has one or more inclusion lists, the hide command operates to remove entries from the inclusion list. The removal of a component identifier from the inclusion list results in the corresponding snapshot component becoming obscured from snapshot access requests. The command uses a specific reference to the snapshot and snapshot component that is to be obscured to remove a corresponding entry from the inclusion list. As with the case of an exclusion list, the hide command may include fields for specifying other component identification or verification information, such as path specifications including wildcards, dates, owners, file size and so forth. The command operates by retrieving a file handle or component ID associated with the specified component, retrieving a snapshot ID and collecting or generating other information related to identification or verification of the component or snapshot. Execution of the command removes the specified component identifier from the inclusion list. As discussed above with respect to an exclusion list, the inclusion list may be arranged in any convenient structure or form to enhance access or searching capabilities.

If a snapshot component that is, hidden or obscured with an inclusion list is to be restored to a visible state, the unhide command may be used to add a corresponding component identifier to the inclusion list. Because typical file and directory lookup commands are unaware of the obscured snapshot component, the snapshot component may not be made visible using the typical snapshot access commands. Instead, the unhide command bypasses the inclusion list to obtain a file handle or component identifier. The unhide command also may include fields for identifying a particular snapshot and other identification or verification information, for example. Once a file handle or component identifier is retrieved, the unhide command adds the identification information to the inclusion list, to permit the corresponding snapshot component to be visible to subsequent snapshot access requests.

As with the case of an exclusion list, automatic operation of the unhide command to add component identifiers to the inclusion list may be undertaken. Moreover, or in the alternative, the inclusion list can be searched to identify particular snapshots, for example, and the component identifiers for the identified snapshots can be deleted. In this way, the inclusion list is maintained with housekeeping operations that may be automated in the event a snapshot is deleted.

In an exemplary embodiment, when the data set is updated in the metafile, the metafile is written to disk. By writing the metafile, the hidden snapshot component information is kept intact, even in the event of a crash. If a metafile is restored after a crash, the most recent version of the metafile is typically used. In general, the hide command does not indicate a successful completion until the data set is safely written to disk, or stored in a transaction log to permit a complete recovery of the hidden snapshot file information. If the hide command is initiated to hide a snapshot component, and a system crash occurs before the hide command completes, any modified data set information may not be saved, and the restored system can include the visible snapshot component.

Other housekeeping activities may include features to accommodate the present invention. For example, if a volume is mounted, the snapshots within the volume may include components marked as hidden. Accordingly, when the volume is mounted, a check on the metafile is conducted to determine if any snapshot components are marked as hidden. If hidden snapshot components are found, the data set is updated with the component data. Once the data set is updated with component identification entries, the appropriate snapshot components will be correctly interpreted as hidden. After the data set is updated, the volume may be mounted following normal processes.

Normal system operations, such as are encountered when processing an inode to return file information, may include modifications to accommodate the feature for hiding snapshot components. For example, if an inode is processed to read the file attributes or to obtain a file handle, the data set is checked to see if information for a requested component should be returned to the user or skipped. If a hidden snapshot component is included in the request, it is skipped or not returned to the requesting user, or a flag indicating that the file does not exist is returned.

Other system commands or operations may also be modified to accommodate the feature of hiding snapshot components in accordance with the present invention. For example, some operations may permit raw blocks of data to be transferred between different storage areas, without accessing the usual file or directory lookup mechanisms. The operations that permit this type of transfer are modified in accordance with the present invention to prevent the transfer of files indicated by the data set as hidden. For example, volume metadata is examined to determine which, if any, files are stored in the raw block of data. These files are then individually checked, as described above.

The present invention also provides a technique for listing hidden components, which is potentially useful for housekeeping and maintenance functions. Listing hidden components may be useful in instances where a user may desire to have a hidden snapshot component restored, but may not know the component name or ID, for example. Operation of such a technique or command can be contingent on the issuer having sufficient privileges or access rights. In the case of an exclusion list, the hidden components may be listed simply by reading the entries in the exclusion list. In the case of an inclusion list, the hidden components may be listed by listing the entire snapshot contents with the exception of the snapshot components that are on the inclusion list.

Because snapshots are taken sequentially over a period of time, the metafile included in each snapshot reflects the state of the file system at the time the snapshot was taken. Any snapshot that is restored to a volume restores the volumes metadata from the snapshot. The hidden component state is also restored from the snapshot according to the metafile in which the hidden snapshot component data is stored. The set of components that were hidden when the restored snapshot was taken will be the hidden components in the exclusion list after the snapshot restoration completes. Accordingly, the restored snapshot includes only hidden component information as of the point in time when the snapshot was taken, and any components hidden after the snapshot was taken will become visible upon restoration.

A particular treatment for hiding directories in a snapshot may be provided in accordance with the present invention. If a directory is designated as hidden, the designation information is stored in the metafile of the snapshot in which the directory exists. If access to a particular component in a hidden directory is attempted, the system and method in accordance with the present invention traverses the directory tree structure upward from the directory in which the component is located to determine if any hidden directories are in the path. If a hidden directory is found in the path that specifies the component, the particular access request is skipped, or a flag is returned indicating no component was found. The directory in which the hidden component is located may then be added to the exclusion list or removed from the inclusion list to reduce any performance penalties associated with traversing a directory tree each time a hidden directory query is made during subsequent requests. Subdirectories under a main hidden directory may also be identified in the data set to also enhance performance of a subsequent hidden component lookup.

The data set is located in the metafile memory associated with the active file system, and as such takes up a certain amount of memory space. Each time the command to add or remove an entry in the data set is successfully completed, the memory allocation is modified accordingly. Deletion of a snapshot that includes components marked as hidden in the data set also provokes a modification of the data set to remove corresponding entries, and modify the allocated memory space accordingly.

From a system perspective, the commands used to access the data set, and the data set itself, are generally secret, or hidden. In an exemplary embodiment, the commands are accessed in a diagnostics mode accessible only to system administrators with specific permissions. Alternately, or in addition, the commands or information about hiding components in a snapshot are not included in online or general help information for commands or general system operations. A system administrator typically runs the commands to access or modify the data set based on requests from users or application programs.

The data set is located in the active file system metafile, which can be stored in volatile memory, for example. If the metafile is indicated as being corrupted, the entire metafile is discarded, meaning that the data set is abandoned along with the other active settings for the file system contained in the metafile. A previous version of the metafile can be used to restore the active system metafile, so that any components that were marked as hidden after the backup metafile was stored will be visible with the restoration of the backup metafile. As with other recoveries from system crashes, or data corruption, these types of issues may be anticipated and dealt with accordingly by system administrators, for example.

It will further be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A system for hiding information related to a component of a file system in a persistent image, the component having an associated component identifier, the system comprising:
    a processor coupled to a memory, the memory storing a data set, wherein the data set is operable as an exclusion list or an inclusion list in which a component identifier and a persistent image identifier in the data set identify a component of a persistent image that is obscured from or visible to access requests for the persistent image, wherein the persistent image represents a previous state of data in the file system at a previous time, wherein a current state of the data in the file system is different than the previous state of data in the file system;
    a lookup mechanism executed by the processor, the lookup mechanism operable to access the persistent image and obtain the information related to the component as it existed as of the previous time;
    the data set being functionally coupled between the lookup mechanism and the persistent image, wherein the lookup mechanism is operable to, responsive to an access request from a user or application program involving the data of the persistent image, check the data set to determine if the component identifier for the component of the persistent image is in the data set; and
    the lookup mechanism being operable to hide or make available the information related to the component of the persistent image if the component identifier is in the exclusion list or inclusion list.

2. The system according to claim 1, further comprising an add command executable by the processor to add a component identifier to the data set.

3. The system according to claim 1, further comprising a remove command executable by the processor to remove a component identifier from the data set.

4. The system according to claim 1, wherein the lookup mechanism further comprises instruction portions being responsive to a component identifier in the data set to avoid accessing the persistent image to obtain the information.

5. The system according to claim 1, further comprising the lookup mechanism being operable to return a response to a request to access the persistent image, the response omitting the information.

6. The system according to claim 1, further comprising the lookup mechanism being operable to return a response to a request to access the persistent image, the response providing an indication of absence of the information.

7. The system according to claim 1, further comprising a system storage structure including system data for contributing to control of system operations, wherein the data set is located in the system storage structure.

8. A method for obscuring information in a persistent image that includes a component of a file system, comprising:
    receiving, by a storage server from a user or application program, a request for access to the component of the persistent image as it existed as of a previous time, wherein the persistent image represents a previous state of data in the file system at the previous time, wherein a current state of the data in the file system is different than the previous state of data in the file system;

responsive to said receiving of the request, examining a data set, the data set operable as an exclusion list or an inclusion list to have an entry to indicate a hidden or visible status of the component in the persistent image, wherein the entry includes a component identifier that identifies the component and a persistent image identifier that identifies the persistent image in which the component is included; and selectively returning a response to the request depending on the hidden or visible status of the component.

9. The method according to claim 8, wherein selectively returning a response further comprises omitting a response when the entry for the component indicates the hidden status.

10. The method according to claim 8, wherein selectively returning a response further comprises indicating an absence of the component when the entry for the component indicates the hidden status.

11. The method according to claim 8, further comprising adding an entry to the data set.

12. The method according to claim 8, further comprising removing an entry from the data set.

13. The method according to claim 11, further comprising repeating adding an entry to the data set based on a multiple entry addition request.

14. The method according to claim 12, further comprising repeating removing an entry from the data set based on a multiple entry removal request.

15. A file management system having a persistent image including a component of a file system, comprising:

a processor coupled to a memory, the memory storing a data set structure operable as an exclusion list or an inclusion list to include an entry for identifying the component as hidden or visible in the persistent image, wherein the persistent image represents a previous state of data in the file system at a previous time, wherein a current state of the data in the file system is different than the previous state of data in the file system, and wherein the entry includes a component identifier operable to identify the component and a persistent image identifier operable to identify the persistent image in which the component is included;

a component lookup mechanism executable by the processor, the component lookup mechanism for accessing the persistent image to retrieve information about the component as it existed as of the previous time; and file system commands executable by the processor to add or remove data set structure entries.

16. The file management system according to claim 15, wherein the data set structure is sorted based on a predetermined key.

17. The file management system according to claim 15, wherein the entry operates to cause the lookup mechanism to retrieve no information about the component.

18. The file management system according to claim 17, wherein the lookup mechanism avoids accessing the component included in the persistent image based on whether the entry identifies the component.

19. The file management system according to claim 18, wherein the lookup mechanism is operable to return a response indicating an absence of the component.

20. The file management system according to claim 15, further comprising a system storage structure for storing system data to contribute to active system operations, wherein the data set is located in the system storage structure.

21. The file management system according to claim 15, further comprising a filter accessible by the processor, the filter for obscuring the component, wherein the filter comprises the data set structure.

22. A filter in a file management system for filtering information related to a component of a file system within a persistent image, comprising:

a processor coupled to a memory, the memory storing a data set, wherein the data set is operable as an exclusion list or an inclusion list in which a component identifier and a persistent image identifier in the data set identify a component of a persistent image that is obscured from or visible to access requests for the persistent image;

a component lookup mechanism executed by the processor, the component lookup mechanism operable to access the persistent image and provide the information related to the component as it existed as of a previous time, wherein the persistent image represents a previous state of data in the file system at the previous time, wherein a current state of the data in the file system is different than the previous state of data in the file system; and the component lookup mechanism operative to access the data set to provide the information related to the component depending on a visibility status from the data set, wherein the visibility status determines if the component is obscured from or visible to access requests for the persistent image.

23. The filter according to claim 22, further comprising the lookup mechanism being responsive to the data set to prevent the lookup mechanism from accessing the persistent image to avoid providing the information related to the component.

24. The filter according to claim 22, further comprising a filter output that omits the information related to the component when the component identifier in the data set includes the component identifier.

25. The filter according to claim 24, wherein the filter output further comprises an indication of the absence of the component in the persistent image.

26. The filter according to claim 22, wherein the file management system comprises a command executable by the processor, the command operable to add or remove an entry in the data set.

27. The filter according to claim 22, wherein the file management system further comprises a system storage structure for storing system data to contribute to active system operations, wherein the data set is located in the system storage structure.

28. The method according to claim 12, wherein said removing of the entry from the data set occurs automatically responsive to the persistent image being deleted.

* * * * *